United States Patent [19]

Martinola

[11] Patent Number: 4,666,608

[45] Date of Patent: May 19, 1987

[54] METHOD FOR RENDERING VISIBLE THE LINE OF SEPARATION BETWEEN CATION EXCHANGERS AND ANION EXCHANGERS IN MIXED-BED FILTERS

[75] Inventor: Friedrich Martinola, Cologne, Fed. Rep. of Germany

[73] Assignee: Bayer Aktiengesellschaft, Leverkusen, Fed. Rep. of Germany

[21] Appl. No.: 717,416

[22] Filed: Mar. 29, 1985

[30] Foreign Application Priority Data

Apr. 11, 1984 [DE] Fed. Rep. of Germany ....... 3413562

[51] Int. Cl.$^4$ .............................................. B01J 47/04
[52] U.S. Cl. ...................................... 210/675; 210/686
[58] Field of Search ................. 210/679, 686, 94, 670, 210/675; 521/28, 26

[56] References Cited

U.S. PATENT DOCUMENTS

| | | | |
|---|---|---|---|
| 2,666,741 | 1/1954 | McMullen | 210/679 |
| 4,151,332 | 4/1979 | Chong et al. | 210/679 |
| 4,473,664 | 9/1984 | Ziarkowski et al. | 521/28 |
| 4,523,996 | 6/1985 | Charles et al. | 210/686 |
| 4,537,911 | 8/1985 | Chonde | 521/28 |

*Primary Examiner*—Ivars Cintins
*Attorney, Agent, or Firm*—Sprung Horn Kramer & Woods

[57] ABSTRACT

Method for rendering visible the line of separation between cation exchangers and anion exchangers in mixed-bed filters, in which method an amount of a cation exchanger (anion exchanger) sufficient to form a visible line is added to the cation exchangers and anion exchangers constituting the mixed-bed, the added ion exchanger clearly differing optically from the cation exchanger and anion exchanger used to build up the mixed-bed and having a density 0.01–0.05 g/ml lower (higher) than that of the mixed-bed cation exchanger (mixed-bed anion exchanger), and the resin beads of which predominantly having the same particle sizes as the finest (coarsest) screen fraction of the mixed-bed cation exchanger (mixed-bed anion exchanger).

7 Claims, No Drawings

METHOD FOR RENDERING VISIBLE THE LINE OF SEPARATION BETWEEN CATION EXCHANGERS AND ANION EXCHANGERS IN MIXED-BED FILTERS

The invention relates to a method for rendering visible the line of separation between cation exchangers and anion exchangers in mixed-bed filters.

Mixed-bed filters are known (see, for example, Ullmanns Enzyklopädie der technischen Chemie [Ullmanns Encyclopedia of Industrial Chemistry], 4th edition, 1977, volume 13, page 324). They are ion exchange filters which are filled with cation exchangers and anion exchangers. During the loading process, cation exchangers and anion exchangers are present in the form of an intimate mixture. For the regeneration of the loaded exchangers the mixed-bed is separated hydraulically by utilization of the different specific gravity and the different particle size of cation exchangers and anion exchangers into its two components, that is to say into a lower layer of the coarse-particled cation exchangers having the higher specific gravity, and an upper layer of the fine-particled anion exchangers having the lower specific gravity. After the separation, cation exchangers and anion exchangers are regenerated and washed separately.

In separating the mixed-bed into its components, it is important not only that the two components separate cleanly from one another and form a sharp line of separation between each other, but also that this line of separation is readily recognisable.

Mixed-bed filters are provided, at the height of the intended line of separation between cation exchanger and anion exchanger, with a device for introducing and running off regenerant and wash solutions (middle drainage). Since it is very important, with regard to the regeneration following the separation, that the line of separation is exactly at the height of this middle drainage, inspection glasses are mounted in mixed-bed filters at the height of the middle drainage, and permit observation of correct and fine adjustment of the line of separation during the separation process and its position when the separation process is complete. After each separation process, a check is made to determine whether the line of separation is once again located exactly at the height of the middle drainage, and, if necessary, the position of the line of separation is corrected, for example by a suitable adjustment of the flow rate of the water flowing upwards.

Because it is very important with regard to monitoring and adjusting the position of the line of separation for the latter to be clearly visible, the following measures have been taken or proposed to data in order to make it clearly visible:

1. To choose the two components, the cation exchanger and the anion exchanger, so that they differ optically; for example, gel-like cation exchangers and macroporous anion exchangers have been combined with one another. However, it has been found in practice that it is difficult to find cation exchanger and anion exchanger combinations which simultaneously possess the desired ion exchanger properties and the required differences in the optical properties. For various reasons, it is often necessary in practice to choose mixed-bed components which differ only slightly, if at all, in colour and appearance. Frequently, it has also been observed in practice that the initially different colours of the two components approach each other during the operating time, for example as a result of contamination of the resin particles.

2. To impart the desired difference in the optical properties to the ion exchanger combination desired from the technical point of view, by colouring one component with dyes. However, this measure, too, has not proved suitable because the dyes are inevitably washed out in the course of time and thus not only does the colour difference between the two components vanish, but the dyes which are washed out furthermore contaminate the solution to be processed.

As a third possible method, it has been proposed that a third inert resin component which differs in colour from the cation exchanger and the anion exchanger be introduced between the cation exchanger and the anion exchanger. However, exact adjustment of the two lines of separation occurring in this case is possible only if the particle size and the specific gravity of the central inert component are exactly between the properties of the cation exchanger and the anion exchanger. Even small deviations from the density or the particle size, as are caused by, for example, contamination and fragmentation of the resin particles, are sufficient to make it impossible to adjust the lines of separation exactly. Furthermore, because it does not take part in the ion exchange process, the additional inert component reduces the active mass in the mixed-bed filter.

It has now been found, surprisingly, that the line of separation between cation exchanger and anion exchanger in a mixed-bed can be rendered visible in a very practical and simple manner which does not have the abovementioned disadvantages, if an amount, just sufficient to form a visible line, of either (a) a cation exchanger which clearly differs optically from the cation exchanger and anion exchanger used to build up the mixed-bed, the density of which is slightly, that is to say 0.01–0.05 g/ml, lower than the density of the mixed-bed cation exchanger, and the particle size of which is approximately equivalent to the particle size of the fine-particled fraction of the mixed-bed cation exchanger, or (b) an anion exchanger which clearly differs optically from the cation exchanger and anion exchanger used to build up the mixed-bed, the density of which is slightly, that is to say 0.01–0.05 g/ml, higher than the density of the mixed-bed anion exchanger, and the particle size of which is approximately equivalent to the particle size of the coarse-particled fraction of the mixed-bed anion exchanger, is added to the mixed-bed components as a separating-line indicator.

Surprisingly, it has been found that, in spite of the fact that its density differs only slightly from the density of the mixed-bed cation exchanger (mixed-bed anion exchanger), the cation exchanger (anion exchanger) to be used as a separating-line indicator preferably assumes a position in the upper region of the mixed-bed cation exchanger (lower region of the mixed-bed anion exchanger), close to the line of separation, where, because of its optical properties, it results in the formation of a sharp, clearly visible line of separation with respect to the mixed-bed anion exchanger (mixed-bed cation exchanger).

The invention therefore relates to a process for rendering visible the line of separation between cation exchanger and anion exchanger in mixed-bed filters after separation of the mixed-bed into its two components, which is characterised in that an amount, sufficient to form a visible line, of either (a) a cation exchanger which clearly differs optically from the cation exchanger and anion exchanger used to build up the mixed-bed and has a density 0.01–0.05 g/ml lower than that of the mixed-bed cation exchanger, and the resin beads of which predominantly have the same particle sizes as the finest screen fraction of the mixed-bed cation exchanger, or (b) an anion exchanger which clearly differs optically from the cation exchanger and anion exchanger used to build up the mixed-bed and has a density 0.01–0.05 g/ml higher than that of the mixed-bed anion exchanger and the resin beads of which predominantly have the same particle sizes as the coarsest screen fraction of the mixed-bed anion exchanger, is added to the cation exchangers and anion exchangers constituting the mixed-bed.

The amounts of a separating-line indicator which are sufficient to form a visible line are in general 1 to 10 vol.%, preferably 3 to 8 vol.%, relative to the volume of the mixed-bed cation exchanger, in case (a), and 1 to 10 vol.%, preferably 2 to 6 vol.%, relative to the volume of the mixed-bed anion exchanger, in case (b).

Within the scope of the process according to the invention, finest or coarsest screen fraction is understood as meaning the fraction which is obtained as, respectively, the finest or coarsest particle size range when the particular mixed-bed ion exchanger is classified to give four different particle size ranges.

Gel-like, strongly acidic cation exchangers and strongly basic anion exchangers generally have a density which is 0.01–0.05 g/ml higher than that of the comparable macroporous, strongly acidic cation exchangers and strongly basic anion exchangers. Since the commercial gel-like cation exchangers and anion exchangers clearly differ optically from the commercial macroporous cation exchangers and anion exchangers—the gel-like ion exchangers are usually translucent/glassy and generally brownish yellow to brown in colour, whereas the macroporous ion exchangers are opaque/chalky and generally whiteish to yellow in colour—gel-like ion exchangers are outstandingly suitable as separating-line indicators in mixed-beds consisting of macroporous ion exchangers, and macroporous ion exchangers are outstandingly suitable as separating-line indicators in mixed-beds consisting of gel-like ion exchangers.

Hence, in a preferred embodiment of the process according to the invention, macroporous ion exchangers are used as separating-line indicators in mixed-bed filters which are filled only with gel-like ion exchangers, and gel-like ion exchangers are used as separating-line indicators in mixed-bed filters which are filled only with macroporous ion exchangers. This preferred embodiment can be carried out in a particularly simple manner by using macroporous cation exchangers as separating-line indicators in the mixed-beds consisting of gel-like cation exchangers and anion exchangers, and using gel-like anion exchangers as separating-line indicators in the mixed-beds consisting of macroporous cation exchangers and anion exchangers.

EXAMPLE 1

In a filter column (internal diameter: 70 mm), a mixed-bed is produced from the following components:

750 ml of a strongly acidic gel-like cation exchanger (optical properties: translucent, brown; density (in the Na form): 1.24 g/ml; particle size of the finest screen fraction: 0.4–0.6 mm)

1000 ml of a strongly basic gel-like anion exchanger (optical properties: translucent, brown; density (in the Cl form): 1.09 g/ml)

30 ml (=4 vol.%, relative to the volume of the strongly acidic gel-like cation exchanger) of a strongly acidic macroporous cation exchanger (optical properties: opaque, whiteish yellow; density (in the Na form): 1.20 g/ml; particle size: 0.4–0.6 mm).

The mixed-bed is loaded in a customary manner and then separated into the cation exchanger and the anion exchanger using an upward flow.

When the separation is complete, the pale indicator cation exchanger has become so highly concentrated in the upper region of the dark mixed-bed cation exchanger, close to the line of separation, that this cation exchanger now forms a pale, clearly visible line of separation with respect to the dark anion exchanger. Without the addition of the indicator cation exchanger, the line of separation between cation exchanger and anion exchanger is not clearly recognisable.

EXAMPLE 2

In a filter column (internal diameter: 50 mm), a mixed-bed is produced from the following components:

500 ml of a strongly acidic macroporous cation exchanger (optical properties: opaque, whiteish yellow; density (in the Na form): 1.20 g/ml)

1000 ml of a strongly basic macroporous anion exchanger (optical properties: opaque, yellowish; density (in the Cl form): 1.06 g/ml; particle size of the coarsest screen fraction: 0.8–1.1 mm)

50 ml (=5 vol.%, relative to the volume of the strongly basic macroporous anion exchanger) of a strongly basic gel-like anion exchanger (optical properties: translucent, brown; density (in the Cl form): 1.09 g/ml; particle size 0.6–1.10 mm).

The mixed-bed is loaded in a customary manner and then separated into the cation exchanger and the anion exchanger using an upward flow.

When the separation is complete, the dark indicator anion exchanger has become so highly concentrated in the lower region of the pale mixed-bed anion exchanger, close to the line of separation, that this anion exchanger now forms a dark, clearly visible line of separation with respect to the pale cation exchanger.

Without the addition of the indicator anion exchanger, the line of separation between the cation exchanger and the anion exchanger is virtually unrecognisable.

What is claimed is:

1. In a mixed-bed ion exchanger process wherein the mixed-bed is loaded, hydraulically separated and subsequently regenerated, the improvement which comprises adding to the cation and anion exchanger forming the mixed-bed either (a) a cation exchanger which clearly differs optically from from the cation exchanger and anion exchanger used to build up the mixed-bed and has a density of 0.01–0.05 g/ml lower than that of the mixed-bed cation exchanger, and the resin beads of which predominantly have the same particle sizes as the finest screen fraction of the mixed-bed cation exchanger, or (b) an anion exchanger which clearly differs optically from the cation exchanger and anion exchanger used to build up the mixed-bed and has a density 0.01–0.05 g/ml higher than that of the mixed-bed anion exchanger, and the resin beads of which predominantly have the same particle sizes as the coarsest screen fraction of the mixed-bed anion exchanger, the material being added in an amount sufficient to form a visible line of separation between the cation and anion exchanger.

2. Method of claim 1, wherein the amount of cation exchanger added is 1 to 10 vol.%, relative to the volume of the mixed-bed cation exchanger, in case (a), and the amount of added anion exchanger is 1 to 10 vol.%, relative to the volume of the mixed-bed anion exchanger, in case (b).

3. Method of claim 1, wherein the amount of added cation exchanger is 3 to 8 vol.%, relative to the volume of the mixed-bed cation exchanger, in case (a), and the amount of added anion exchanger is 2 to 6 vol.%, relative to the volume of the mixed-bed anion exchanger, in case (b).

4. Method of claim 1, wherein 1 to 10 vol.%, relative to the volume of the cation exchanger, of a macroporous cation exchanger which has an opaque appearance at a density 0.01–0.05 g/ml lower than that of the mixed-bed cation exchanger, and the resin beads of which predominantly have the same particle sizes as the finest screen fraction of the cation exchanger, is added to the cation exchanger and anion exchanger which form the mixed-bed.

5. Method of claim 4, wherein the macroporous cation exchanger having an opaque appearance is added in an amount of 3 to 8 vol.%, relative to the volume of the cation exchanger.

6. Method of claim 1, wherein 1 to 10 vol.%, relative to the volume of the anion exchanger, of a gel-like anion exchanger which has a glassy translucent appearance at a density 0.01–0.05 g/ml higher than that of the mixed-bed anion exchanger, and the resin beads of which predominantly have the same particle sizes as the coarsest screen fraction of the anion exchanger, is added to the cation exchanger and anion exchanger which form the mixed-bed.

7. Method of claim 6, wherein the gel-like anion exchanger having a glassy translucent appearance is employed in an amount of 2 to 6 vol.%, relative to the volume of the anion exchanger.

* * * * *